Nov. 6, 1962  I. M. DAVIDSON  3,062,483
AEROFOIL BOUNDARY LAYER CONTROL SYSTEMS
Filed June 20, 1961  3 Sheets-Sheet 1

*Inventor*
Ivor Macaulay Davidson
By Stevens Davis Miller & Mosher
*Attorneys*

Nov. 6, 1962     I. M. DAVIDSON     3,062,483

AEROFOIL BOUNDARY LAYER CONTROL SYSTEMS

Filed June 20, 1961     3 Sheets-Sheet 2

Inventor
Ivor Macaulay Davidson
By
Stevens Davis Miller & Mosher
Attorneys

Nov. 6, 1962  I. M. DAVIDSON  3,062,483
AEROFOIL BOUNDARY LAYER CONTROL SYSTEMS
Filed June 20, 1961  3 Sheets-Sheet 3

Inventor
Ivor Macaulay Davidson
By Stevens Davis Miller & Mosher
Attorneys

United States Patent Office 3,062,483
Patented Nov. 6, 1962

3,062,483
AEROFOIL BOUNDARY LAYER CONTROL SYSTEMS
Ivor Macaulay Davidson, Farnborough, England, assignor to Power Jets (Research and Development) Limited, London, England, a British company
Filed June 20, 1961, Ser. No. 118,327
Claims priority, application Great Britain Sept. 17, 1958
13 Claims. (Cl. 244—42)

The present application is a continuation-in-part of application Serial No. 839,373, filed September 11, 1959, in the name of the present applicant, and now abandoned.

This invention relates to aerofoil bodies, that is, bodies so shaped and arranged that when in motion relative to a fluid stream, they are subjected to an aerodynamic lifting force in a direction transverse to the direction of relative movement. The invention has particular application to aircraft wings and stabilisers, i.e. tailplanes and, in the case of aircraft of canard layout, foreplanes, but it is also considered to be applicable to aircraft fins (in which case the lifting force is exerted in a sideways or horizontal direction), to rotary wings, i.e., helicopter rotor blades, and to aerofoil bodies generally.

The invention is further concerned with boundary layer control systems for aerofoils, i.e., systems whereby fluid streams may be discharged through apertures in an aerofoil surface to flow over the surface or fluid drawn in through apertures in the surface to effect control of the boundary layer on the aerofoil surface. An object of the invention is the provision of a system whereby considerable lift variation and augmentation is achieved by control of the boundary layer.

The invention accordingly provides an aerofoil boundary layer control system comprising an aerofoil with a rounded trailing edge in which provision is made for effecting differential control of the boundary layer at positions on the aerofoil surface on each side of the trailing edge.

In particular boundary layer control is effected by the discharge of fluid streams over the aerofoil surface. Thus the invention further provides an aerofoil boundary layer control system comprising an aerofoil with a rounded trailing edge, spanwise-extending discharge apertures in the aerofoil surface at positions on each side of, i.e., above and below, the trailing edge, each arranged to discharge a fluid stream as a layer rearwardly over the surface towards the trailing edge, and means for varying the flow of the two streams relative to one another. In this way the circulation around and the lift on the aerofoil can be varied. According to a feature of the invention, the aerofoil also has adjacent the above-mentioned discharge aperture in one of its surfaces (hereinafter referred to as the undersurface) a third spanwise-extending discharge aperture arranged to discharge a fluid stream as a layer forwardly over the undersurface away from the trailing edge. This stream will reinforce the stream discharged from the aperture in the aerofoil upper surface so that the rear stagnation is moved forwardly away from the trailing edge past the third aperture onto the undersurface, whereby a substantial increase in lift can be achieved. The aerofoil also has a fourth spanwise-extending discharge aperture in its undersurface spaced forwardly from the third aperture and arranged to discharge a fluid stream as a layer rearwardly over the undersurface towards the trailing edge. By varying the flows of the two streams flowing forwardly and rearwardly over the under surface, the position of the rear stagnation point and hence the lift on the aerofoil can be varied.

The operation of the invention will now be described in greater detail with reference to the accompanying diagrammatic drawings, of which:

Figure 1:
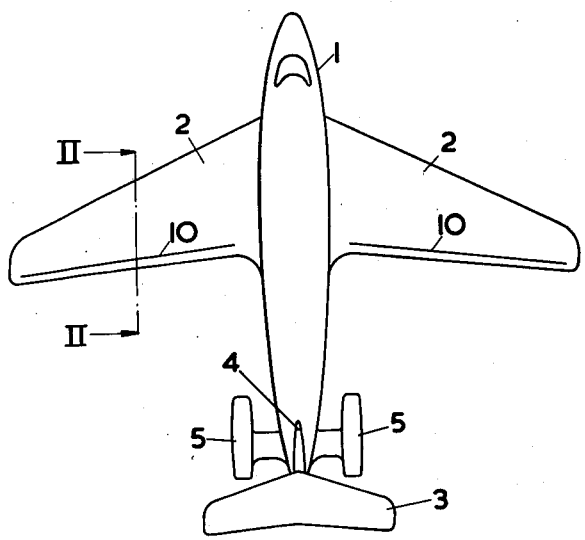
FIGURE 1 is a plan view of an aircraft having a boundary layer control system according to the invention.

The aircraft of FIGURE 1 comprises a fuselage 1, a pair of opposite wings 2, a stabiliser or tailplane 3 and a fin 4. It is powered by two gas turbine jet propulsion engines 5 mounted in pods, one on each side of the rear of the fuselage. It is to be understood however that the engines equally well could be mounted elsewhere in the aircraft in known manner.

Figure 2:
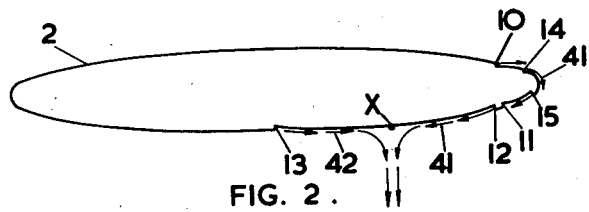
FIGURE 2 is a section through one wing of the aircraft, the section being taken on the line II—II in FIGURE 1.
Figure 3:
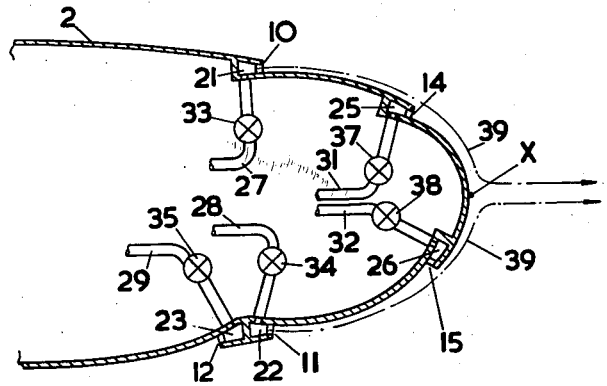
FIGURES 3 and 4 are enlarged sectional views of parts of the wing shown in FIGURE 2.
Figure 4:
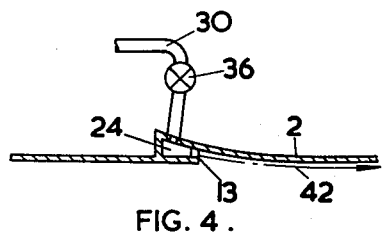
Figure 5:
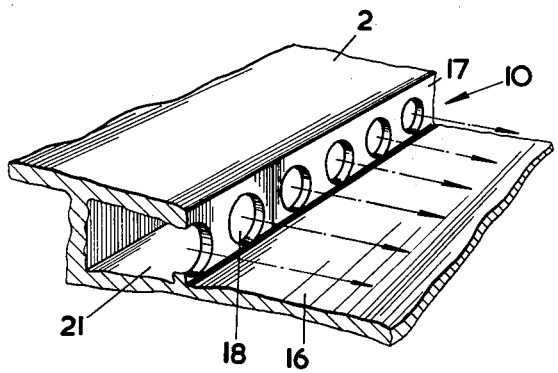
FIGURE 5 is a perspective view of a detail of the aircraft wing.

As shown in FIGURE 2 each wing 2 is of substantially elliptical cross-section with a rounded or blunt trailing edge, and it is formed in its surface with a number of boundary layer control apertures or slots 10, 11, 12, 13, 14 and 15. These apertures are shown in greater detail in the enlarged views of FIGURES 3 and 4, while the construction of aperture 10, which is typical of the remaining apertures, is shown in FIGURE 5. Thus aperture 10 (the first aperture) is constituted by a recess in the wing upper surface, roughly triangular in section and extending along substantially the full span of the wing or at any rate preferably along a major part of the span at a position spaced a short distance forwardly of the wing trailing edge. The downstream face 16 of the recess (with respect to the general direction of the main stream air flow over the wing) is smoothly curved, e.g. to a circular arc, so that it merges smoothly into the wing surface, while the upstream face 17 is approximately normal to the other face and is formed with a spanwise-extending row of closely spaced discrete holes 18 which accordingly face rearwardly towards the wing trailing edge and in a downstream direction with respect to the main stream flow over the wing. In some cases there may be more than one row of holes, and it is possible that the face might be formed with a substantially continuous slit or a series of slits occupying practically its whole extent. The parts of the wing surface upstream and downstream of the recess are continuous with one another in that they conform to the original elliptical cross-section of the wing.

The aperture 11 is constituted by a spanwise-extending recess in the wing lower surface spaced from the trailing edge by the same distance as the aperture 10. The recess is exactly the same as the recess constituting the aperture 10, and is arranged so that the holes face towards the trailing edge.

The aperture 12 is constituted by a third spanwise-extending recess in the wing lower surface adjacent and slightly forward of the recess constituting aperture 11. This third recess is of the same general configuration as the adjacent recess, but is reversed with respect thereto, that is, the upstream face with respect to the main stream flow over the wing merges into the wing surface, while the holes are formed in the other face, and so face upstream or forwardly.

The aperture 13 is constituted by a fourth spanwise-extending recess located in the wing undersurface considerably upstream of the trailing edge, at approximately the mid-chord position. This recess is of similar configuration to those already described, with the holes facing downstream towards the wing trailing edge.

In addition the wing is formed with yet two more apertures 14 and 15 constituted by spanwise-extending recesses in the wing upper and lower surfaces respectively, between the apertures 10 and 11 and the trailing edge. These recesses are again of the same configuration as the others, the recess constituting aperture 14 being arranged so that the holes face rearwardly towards the trailing edge while the holes of aperture 15 face forwardly away from the trailing edge.

The holes of each aperture open into the recess from a manifold extending spanwise within the wing. The manifolds for the apertures 10–15 are shown at 21–26 respectively in FIGURE 3 and 4, and these are connected to a source of supply of compressed air through conduits 27–32 including valves 33–38 (see also FIGURE 6). By means of these valves compressed air can be supplied selectively to the various boundary layer control apertures.

Thus under normal forward flight conditions, the valves 33 and 34 are opened to supply air to the apertures 10 and 11. The spacing of the holes 18 of each aperture is such that the discrete air jets issuing therefrom combine to form a layer extending continuously spanwise of the wing, and these layers flowing over the wing surface towards the trailing edge on each side thereof have a boundary layer control effect and, as indicated by the broken lines 39 in FIGURE 3, serve to close up the wake which would otherwise be set up behind the rounded trailing edge. If the mass flows and velocities of the two air streams are equal and the wing is at approximately zero incidence relative to the general direction of the main stream flow past the wing, i.e. the flight path of the aircraft, the rear stagnation point X will be located at the rearward extremity of the wing. By varying the relative mass flows and/or velocities of the two streams, the stagnation point can be stabilised at various positions between the apertures 10 and 11, and the consequent variation of the circulation around the aerofoil will give rise to a variation in lift on the wing. Valves 33 and 34 are accordingly linked to a common control 40 arranged to operate the valves in opposite senses so that when the flow to aperture 10 is increased, the flow to aperture 11 is simultaneously decreased, and vice versa. By manipulation of control 40, a lift variation on the wings, analogous to that normally effected by ailerons, can be effected.

When a large increase in wing lift is required, valve 34 is closed so that the supply of air to the aperture 11 is reduced and finally discontinued, while valves 35, 37 and 38 are opened so that air is supplied to the apertures 12, 14 and 15. The streams of air discharged over the wing surface from these apertures and from aperture 10 will then reinforce one another, as shown by the arrows 41 in FIGURE 2 and will flow around the wing trailing edge forwardly over the undersurface, and the rear stagnation point X will be moved to a position on the wing undersurface, thus giving rise to a considerable increase in lift. At the same time, valve 36 is opened so that an air stream is discharged rearwardly as a layer over the wing undersurface as indicated by the arrows 42 in FIGURE 2, and by adjustment of the relative mass flows and/or velocities of the streams flowing forwardly and rearwardly over the wing undersurface, the stagnation point can be stabilised at a desired position between apertures 12 and 13, depending on the amount of lift required. Valves 34–38 are thus linked to a common control 43 which is arranged to operate the valves so that as valve 34 is closed valves 37, 38 and 35 are opened in sequence. Control 43 can thus be manipulated to give a lift variation analogous to that normally effected by wing flaps, variation in lift being effected by differential adjustment of valve 36 in relation to one or more of valves 33, 35, 37 and 38.

Figure 6:
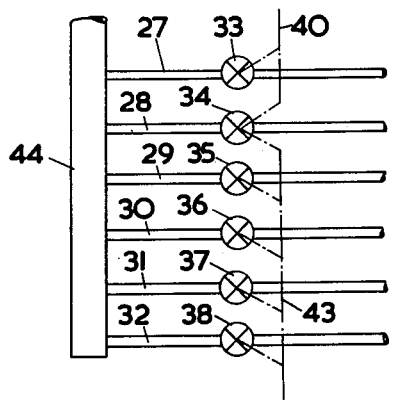
FIGURE 6 is a schematic representation of the controls for the boundary layer control system.

The showing of the valve operating mechanism of FIGURE 6 is purely diagrammatic. In practice an override mechanism is provided whereby when control 40 is at the end of its range of travel, corresponding to maximum flow through aperture 10 and minimum flow through aperture 11, control 43 can take over to close valve 34 completely and at the same time open valves 35, 36, 37, 38. The control 40 is accordingly formed as a push rod pivotally connected to the operating arm of valve 33 and bearing against but not otherwise connected to the operating arm of valve 34. The valve is spring loaded towards the open position and can be turned against the spring by the push rod until it (the push rod) comes up against a stop. The control 43 is a rod pivotally connected to the operating arm of valve 34 and is operable to turn the valve beyond the limit set by the stop to close it completely. As it does so it also contacts the operating arms of the valves 35, 36, 37, 38 (which are spring loaded towards the closed position) to open them in the required sequence.

As indicated in FIGURE 6, supply pipes 27–32 are branched from a common manifold 44 which is connected to receive compressed air from the compressors of the main gas turbine engines 5 or from one or more auxiliary compressors.

In a modified form of the invention, the aperture 11 is dispensed with, and provision is made for applying suction to aperture 12 in normal forward flight conditions so that some or all of the boundary layer on the wing lower surface is withdrawn therethrough. Similarly the apertures 14 and 15 may be replaced by apertures designed for boundary layer suction.

It is to be noted that the shaping of the recesses constituting the boundary layer control apertures, as described above, is intended to ensure that when they are not in use, that is, when no air is being discharged or withdrawn therethrough, they create the minimum disturbance in the air flow over them.

In a further modified form of the invention, each wing of the aircraft is formed in its undersurface with a spanwise-extending nozzle or series of nozzles arranged to discharge a fluid stream downwardly as a long thin jet sheet extending along substantially the whole, or at any rate, preferably the major part of the wing span. This fluid stream may be compressed air from the compressors, or exhaust gases from the engines. The boundary layer control apertures 10, 12, 14, 15 will be such that when air streams are discharged therethrough, the rear stagnation point will be moved to the point of discharge of the jet sheet. The aperture 13 is omitted. The jet sheet acts as a "jet flap" which will interact with the main stream flow over the wing so as to modify the aerodynamic pressure distribution and give rise to a substantial increase in lift. Provision may also be made for applying boundary layer control at the wing leading edge.

In some cases, the apertures 14 and 15 could be replaced by a single aperture, while in other cases, a greater number of apertures may be required between apertures 10 and 11 to promote flow of boundary layer around the wing trailing edge. It would also be possible to apply suction at the positions at which the apertures such as 14 and 15 are located.

It has been found that although the two streams from apertures to 10 and 11 tend to close up the wake behind the aerofoil to some extent, vortices are unavoidably present in the region of the stagnation point and losses will arise. According to a feature of the present invention therefore, provision is made for applying distributed suction to the trailing edge part of the aerofoil surface between the two apertures. Preferably the surface of the aerofoil between the apertures is formed of porous material or with a large number of small discrete holes whereby suction may be applied uniformly over the whole trailing edge. In this way the vortices can be reduced or substantially eliminated.

Figure 7:
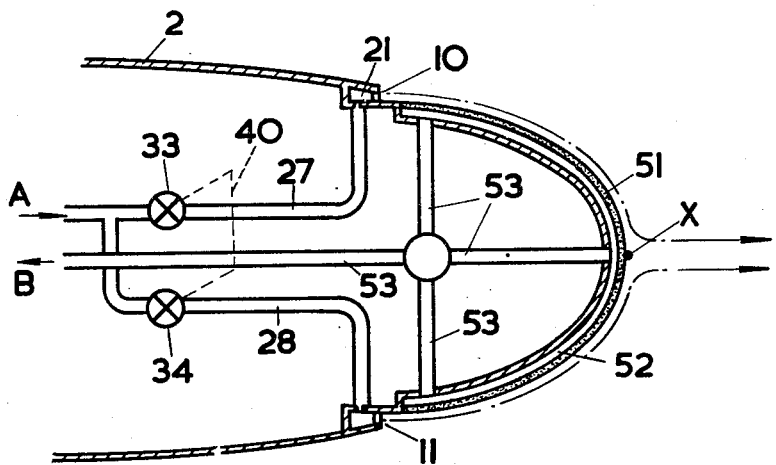
FIGURE 7 is a view corresponding to FIGURE 3 showing a modification.

Such a modified form of the invention is shown in FIGURE 7. Each wing 2 of the aircraft of FIGURE 1 is of substantially elliptical cross-section with a rounded or blunt trailing edge, and it is formed in its surface with two similar boundary layer control apertures or slots 10, 11 which are the same as those described with reference to FIGURES 2 and 3. The holes 18 of each aperture open into the recess from manifolds 21, 22 extending spanwise within the wing. The manifolds are connected through conduits 27, 28 including valves 33, 34 to a source of supply of compressed air, e.g., the compressors of the aircraft gas turbine engines 5 or one or more auxiliary compressors.

The rounded trailing edge surface 51 of the wing between the apertures 10, 11 is made of a material suitable for the application of distributed suction to the surface. This material may be porous sintered metal sheet or sheet formed with a large number of small closely spaced discrete holes in known manner. A chamber 52 is provided behind this sheet and is connected through conduits 53 to a source of suction, e.g. the compressors of the engines 5 or the auxiliary compressors or compressors referred to above.

In operation of the aircraft compressed air is supplied to apertures 10, 11 as indicated by arrow A, while suction is applied to the rounded trailing edge surface 51 as indicated by arrow B. The spacing of the holes 18 of each aperture is such that the discrete air jets issuing therefrom combine to form a layer extending continuously spanwise of the wing, and these layers flowing over the wing surface have a boundary layer controll effect and tend to close up the wake which would otherwise exist behind the rounded trailing edge. As mentioned above there is unavoidably a tendency for vortices to be set up at the wing trailing edge as indicated at 55 in FIGURE 8a, but by the application of suction these vortices are reduced or substantially eliminated. Thus if the mass flows and velocities of streams from apertures are equal and the wing is at approximately zero incidence relative to the general direction of the main stream flow past the wing, i.e. the flight path of the aircraft, the rear stagnation point X will be located at the rearward extremity of the wing as shown in FIGURE 7.

Figure 9:
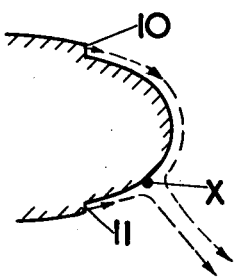

By varying the relative mass flows and/or velocities of the two streams, the stagnation point can be stabilised at various positions between apertures 10 and 11—for example, as shown in FIGURE 9—and the consequent variation of the circulation around the wing will give to a variation in lift. Valves 33 and 34 are accordingly linked to a common control 40 arranged to operate the valves in opposite senses so that when the flow to aperture 10 is increased, the flow to aperture 11 is simultaneously decreased, and vice versa. By manipulation of control 40, a lift variation on the wing, equivalent to that normally produced by ailerons or flaps, can be effected.

Figure 8:
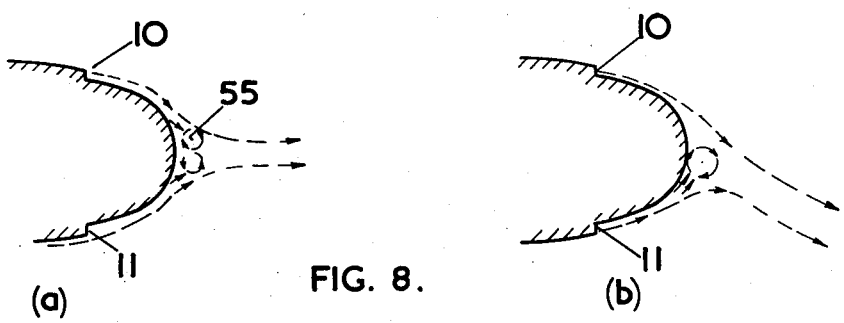
FIGURES 8a, 8b and 9 are explanatory diagrams showing the operation of the invention.

It is to be noted that in the absence of suction over the trailing edge surface, if the mass or velocity flow of one stream is increased relative to the other, the weaker stream will still tend to force the stronger of the surface at much the same position in the manner indicated in FIGURE 8b. The combined streams will then leave the wing at an inclination depending on the relative momenta of the two streams, and will have an effect similar to that of a "jet flap." By the application of suction, however, the rear stagnation point can be located at a desired position on the trailing edge surface, and it is believed that lift can be increased with a smaller expenditure of compressed air than in the case of a "jet flap" system.

Figure 10:
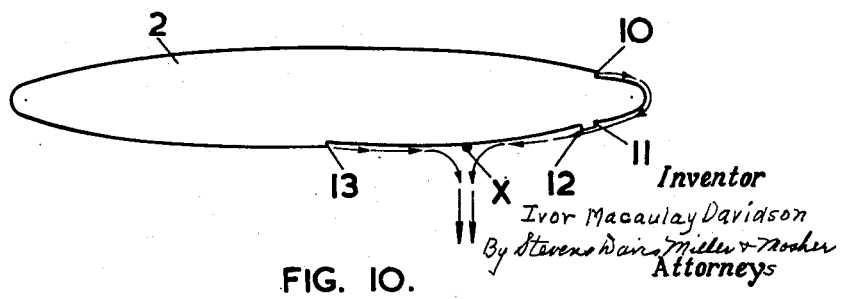
FIGURE 10 is a view corresponding to FIGURE 2 showing a further modification.

FIGURE 10 shows the application of the modified form of the invention as just described to an aircraft wing including third and fourth boundary layer control apertures 12 and 13 as shown in FIGURE 2. The third aperture 12 is constituted by a third spanwise extending recess in the wing lower surface adjacent to and slightly forward of the recess constituting aperture 11. This third recess is of the same general configuration as the adjacent recess, but is reversed with respect thereto that is, the upstream face with respect to the main stream flow over the wing merges into the wing surface, while the holes are formed in the other face, and so face upstream or forwardly. The fourth boundary layer control aperture 13 is constituted by a fourth spanwise-extending recess located in the wing undersurface considerably upstream of the trailing edge, at approximately the mid-chord position. This recess is of similar configuration to those already described, with the holes facing downstream towards the wing trailing edge.

When a large increase in wing lift is required, the supply of air to the aperture 11 is reduced and finally discontinued, while air is supplied to the aperture 12. The streams of air discharged over the wing surface from this aperture and the aperture 10 in the wing upper surface will then reinforce one another, and will flow around the wing trailing edge forwardly over the undersurface, and the rear stagnation point will be moved to a position on the wing undersurface, thus giving rise to a considerable increase in lift. At the same time, air is supplied to the aperture 13 so that an air stream is discharged rearwardly as a layer over the wing undersurface, and adjustment of the relative mass flows and/or velocities of the streams flowing forwardly and rearwardly over the wing undersurface, the stagnation point X can be stabilised at a desired position between the third and fourth apertures, as shown in FIGURE 10, depending on the amount of lift required.

It is intended that suction shall be applied to the trailing edge surface 51 under all flying conditions. Thus in the high lift phase referred to above, suction will serve to assist the flow of the stream from the aperture 10 around the trailing edge. The additional boundary layer control apertures 14, 15 provided in the arrangement of FIGURES 2 and 3 should then be unnecessary.

It would be possible to provide in a like manner for distributed suction in the wing undersurface between the third and fourth boundary layer control apertures 12, 13 but in practice this should be unnecessary as the lossess due to the vortices existing under high lift conditions will not be significant.

In some embodiments the region of distributed suction will not extend over the surface 51 as far forward as the discharge apertures 10, 11, while in other embodiments it may be extended forwardly thereof.

The invention is also applied to the aircraft tailplane 3 and to the fin 4, each being of elliptical section with boundary layer control apertures similar to apertures 10 and 11 in the wings and including provision for applying distributed suction to the trailing edge. By varying the relative flows through these apertures, lift variations corresponding to those normally effected by the elevators and the rudder can be effected. If necessary further boundary layer control apertures as in the wings can be provided.

In any of the embodiments described, the wings, tailplane and fin could be of a shape other than elliptical provided it has a similarly rounded or blunt trailing edge.

In all the drawings, the size of the boundary layer control apertures has been considerably exaggerated for the sake of clarity. In practice, it is considered that for an aircraft wing of the order of 15–20 ft. chord, the depth of the boundary layer control apertures would be of the order of 0.10 inch, and that this proportion would be maintained for aerofoils of other sizes.

I claim:
1. An aerofoil boundary layer control system comprising an aerofoil body having opposite first and second side surfaces merging at the rearward end of the areofoil body into a rounded trailing edge surface, said aerofoil body being formed with first and second spanwise-extending discharge apertures in said first and second side surfaces respectively, one said aperture lying on each side of the trailing edge, each said aperture being shaped and arranged to discharge a fluid stream as a layer rearwardly over said trailing edge surface towards the rearward end of the aerofoil body, a third spanwise-extending aperture in said second side surface adjacent said second aperture and shaped and arranged to discharge a fluid stream forwardly over said second side surface away from the rearward end of the aerofoil body, and a fourth spanwise-extending discharge aperture in said second side surface spaced forwardly from the third aperture and shaped and to discharge a fluid stream rearwardly over said second side surface towards the third aperture; a source of supply of fluid; and supply means connecting said source to each of said apertures.

2. A system according to claim 1 wherein the aerofoil body is formed with at least one further spanwise-extending discharge aperture in its trailing edge surface between said first and second apertures, said further aperture being shaped and arranged to discharge a fluid stream as a layer over said trailing edge surface in a direction away from said first aperture and towards said second aperture.

3. A system according to claim 1 wherein said fourth aperture is located at the mid-chord position of the aerofoil body.

4. A system according to claim 1 wherein each aperture is constituted by a spanwise-extending recess in the aerofoil surface, the recess having a first face smoothly curved to merge into the aerofoil surface and a second face approximately normal to the first-mentioned face, said second face being formed with at least one hole for the discharge of the fluid stream.

5. A system according to claim 4 wherein said second face of the recess is formed with at least one spanwise-extending row of closely spaced holes for the discharge of the fluid stream.

6. A system according to claim 1 comprising valve means in the supply means connecting said source to said first and second apertures, said valve means being operable to increase the flow to one of said apertures and simultaneously to decrease the flow to the other of said apertures.

7. A system according to claim 1 comprising valve means in the supply means connecting said source to each of said apertures, said valve means being operable to discontinue the supply of fluid to said second aperture and simultaneously to turn on the supply of fluid to said third and fourth apertures.

8. A system according to claim 1 wherein said aerofoil body is elliptical in cross-section.

9. An aerofoil boundary layer control system comprising an aerofoil body having opposite first and second side surfaces merging at the rearward end of the aerofoil body into a rounded trailing edge surface, said aerofoil body being formed with first and second spanwise-extending discharge apertures in said first and second side surfaces respectively, one said aperture being on each side of the trailing edge, each said aperture being shaped and arranged to discharge a fluid stream as a layer rearwardly over said trailing edge surface towards the rearward end of the aerofoil body; a source of supply of fluid; supply means connecting said source to each of said apertures; valve means operable to vary the flow of the streams discharged from said apertures relative to one another; and means for applying distributed suction to said trailing edge surface between said two apertures.

10. A system according to claim 9 wherein said trailing edge surface between said apertures is formed of porous material and said aerofoil is formed with a chamber behind said trailing edge surface, and further comprising a source of suction and means connecting said source to said chamber.

11. A system according to claim 9 wherein said trailing edge surface between said apertures is formed with a large number of small closely spaced discrete holes and said aerofoil is formed with a chamber behind said trailing edge surface, and further comprising a source of suction and means connecting said source to said chamber.

12. A system according to claim 9 wherein each aperture is constituted by a spanwise-extending recess in the aerofoil surface, the recess having a first face smoothly curved to merge into said trailing edge surface and a second face approximately normal to the first mentioned face, said second face facing towards the rearward end of the aerofoil body and being formed with at least one hole for the discharge of the fluid stream.

13. A system according to claim 12 wherein said second face is formed with at least one spanwise-extending row of closely spaced holes for the discharge of the fluid stream.

References Cited in the file of this patent
UNITED STATES PATENTS

| | | |
|---|---|---|
| 2,643,832 | Thwaites | June 30, 1953 |
| 2,841,344 | Stroukoff | July 1, 1958 |
| 2,885,160 | Griswold | May 5, 1959 |
| 2,927,748 | Griswold | Mar. 8, 1960 |

UNITED STATES PATENT OFFICE
CERTIFICATE OF CORRECTION

Patent No. 3,062,483                                November 6, 1962

Ivor Macaulay Davidson

It is hereby certified that error appears in the above numbered patent requiring correction and that the said Letters Patent should read as corrected below.

Column 7, line 10, after "and", second occurrence, insert -- arranged --.

Signed and sealed this 7th day of May 1963.

(SEAL)
Attest:

ERNEST W. SWIDER
Attesting Officer

DAVID L. LADD
Commissioner of Patents